Aug. 9, 1927.  
C. S. ALLEN  
1,638,007

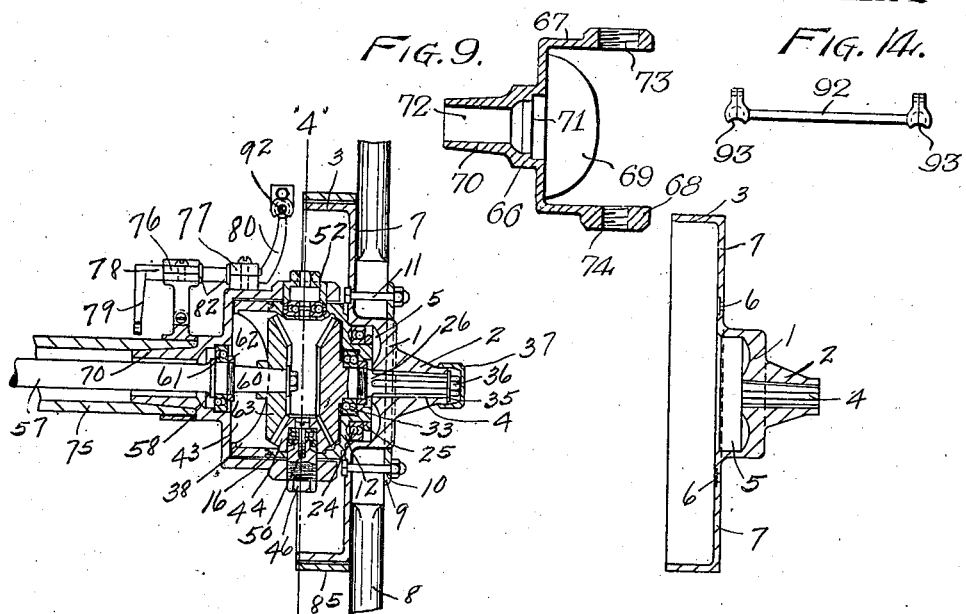

FRONT WHEEL DRIVE BRAKE MECHANISM

Filed April 26, 1924  2 Sheets-Sheet 2

Inventor  
Charles S. Allen  
By Adam E. Fisher.  
Attorney

Patented Aug. 9, 1927.

1,638,007

UNITED STATES PATENT OFFICE.

CHARLES S. ALLEN, OF SAN FRANCISCO, CALIFORNIA, ASSIGNOR OF ONE-TWENTIETH TO JOHN SPEREKAS AND FRANK COURES, BOTH OF CINCINNATI, OHIO; THERRON J. ALLEN ADMINISTRATOR OF THE ESTATE OF SAID CHARLES S. ALLEN, DECEASED.

FRONT-WHEEL-DRIVE BRAKE MECHANISM.

Application filed April 26, 1924. Serial No. 709,091.

This invention is in the way of a driving and braking arrangement for the front wheels of a four wheel drive automobile and its primary object is to provide an efficient and practical drive and braking arrangement for the front wheels of an automobile of a very simple construction.

Another object is to eliminate the skidding of the rear wheels by forcing them to follow the front wheels which is effected in a four wheel drive.

Another object is to provide a means whereby the steering of the front wheels is effected in a very simple manner.

Another object is to provide a differential whose spindle is rigidly secured in the hub of the wheel in a very simple manner, yet may be readily disassembled if desired.

A further object is to provide a differential housing of a ball and socket type that will completely enclose the differential and keep it dust-proof without interfering with the steering of the wheel.

A still further object is to provide a ball and socket arrangement in the brake rods to permit the ready steering of the front wheels.

A still further object is to provide a drive whose differential is constructed in such a manner to eliminate all possible friction.

These and other objects will be apparent from the accompanying drawings and specifications.

In the drawing

Figure 1 is a longitudinal, vertical section of the assembled driving arrangement of one of the front wheels;

Figure 2 is a horizontal section of the assembled driving arrangement of one of the front wheels;

Figure 5 is a sectional detail of the combined hub and brake drum;

Figure 6 is a detailed side view of the combined hub and brake drum;

Figure 9 is a sectional detail of the secondary yoke;

Figure 14 is a detail of the ball and socket brake rods;

Figure 3:
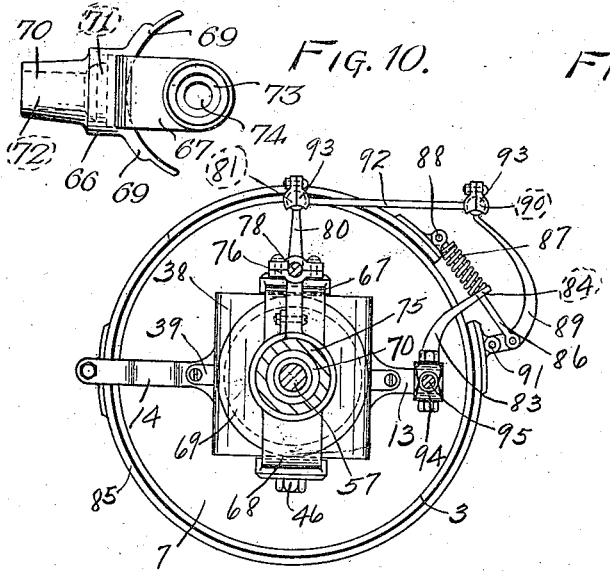
Figure 3 is a side view of the assembled driving arrangement.
Figure 10:
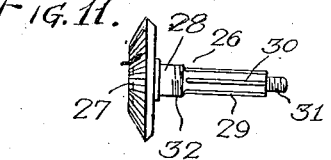
Figure 10 is a detailed plan view of the secondary yoke.
Figure 11:
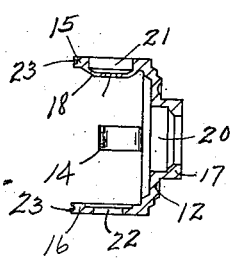
Figure 11 is a detail of the spindle.
Figure 7:
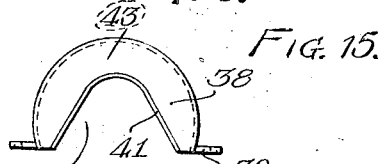
Figure 7 is a sectional detail of the primary yoke.
Figure 12:
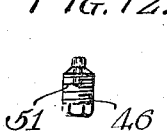
Figure 12 is a detail of the primary stud.
Figure 13:
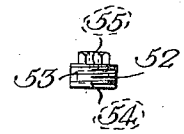
Figure 13 is a detail of the secondary stud.
Figures 8, 15:
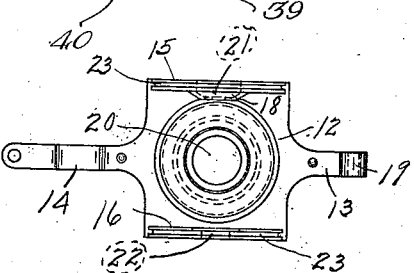
Figure 8 is a detailed plan view of the primary yoke.
Figures 15 and 16 are detailed views of the gear housing.
Figure 4:
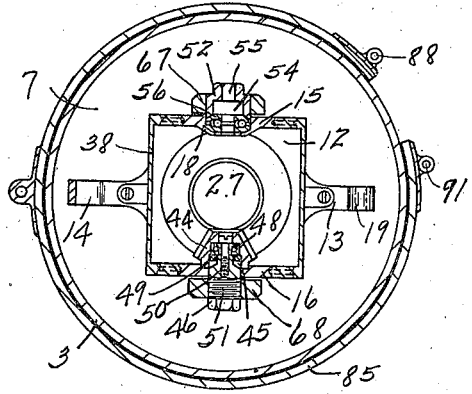
Figure 4 is a section on line 4—4 of Figure 1.
Figure 16:
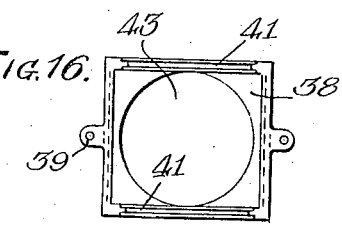

In carrying out this invention I provide a hub 1, having a bearing 2 and a brake drum 3 incorporated therein; a fluted aperture 4 is provided in the bearing 2. An aperture 5 is provided in the hub 1; said aperture 5 communicates with the fluted aperture 4 in the bearing 2. Bolt holes 6 are provided in the flange 7 of the brake drum 3. A wheel 8 is mounted on the hub 1. A ring 9 having bolt holes 10 provided therein is mounted on the hub 1 on the outside of the wheel 8. Bolts 11 are passed through the bolt holes 6 of the flange 7 of the brake drum 3, and the spokes of the wheel 8 and the bolt holes 10 of the ring 9, in order to keep the wheel 8 rigidly secured to the hub 1. A primary yoke 12 is provided for a purpose to be later explained. Arms 13 and 14, ears 15 and 16 and a collar 17 are incorporated in the primary yoke 12. A lug 18 is incorporated in the ear 15. A lug 19 is incorporated in the arm 13. An aperture 20 is provided in the yoke 12 and the collar 17; the said aperture 20 has steplike reductions provided therein. A secondary stud aperture 21 is provided in the ear 15 and lug 18, and a primary stud aperture 22 is provided in the ear 16. Grooves 23 are cut in the outer edge of the ears 15 and 16. A ball bearing race 24 is pressed onto the collar 17, and a ring 25 is rigidly secured on the said collar 17 on the outer side of the ball bearing race 24. The ball bearing race 24 of the collar 17 engages the periphery of the aperture 5 of the hub 1. A spindle 26 has a beveled gear 27 rigidly secured to its one end 28, and has its opposite end 29 fluted as shown at 30. A reduced threaded portion 31 is provided in the end 29. A portion 32 of the end 28 is threaded.

A ball bearing race 33 is pressed onto the end 28 in back of the beveled gear 27, and a collar 34 is screwed onto the threaded portion 32 and is adapted to bear against said ball bearing race 33 to prevent it from working loose. A spindle 26 is passed through the aperture 20 of the collar 17 of the yoke 12, and with its fluted end 30 engages the fluted aperture 4 of the bearing 2. A lock washer 35 and a nut 36 engage the threaded end 31 in order to keep the primary yoke 12 and the spindle 26 mounted within the hub 1 and bearing 2. A cap 37 engages the outer end of the bearing 2. A gear covering 38 having ears 39 incorporated therein, is secured to the primary yoke 12. Apertures 40 are cut in the gear covering 38 and have ridges 41 provided in their edges. Said apertures 40 correspond to the shape of the ears 15 and 16 and have their ridges 41 adapted to engage the grooves 23 of the said ears 15 and 16. An aperture 43 is provided in the gear covering 38 for a purpose to be later explained. A beveled pinion 44, having a partly threaded aperture 45 provided therein, is mounted within the gear covering 38 through the medium of a primary stud 46. The said beveled pinion 44 meshes with the beveled gear 27. A ball bearing race 48 is mounted within the aperture 45 of the beveled pinion 44 and is secured therein by means of a collar 49 which engages the threaded portion of the aperture 45 of the beveled pinion 44 and a screw 50 which is passed through the aperture 45 of the said beveled pinion 44 and secured in the primary stud 46. The said primary stud 46 is threaded as shown at 51. A secondary stud 52 which is threaded as shown at 53 engages the secondary stud aperture 21 of the ear 15. The said secondary stud 52 has apertures 54 and 55 provided therein. A ball bearing race 56 is mounted in the secondary stud aperture 21 of the ear 15, below the secondary stud 52. The aperture 55 is provided to facilitate the lubrication of the gears. An axle 57 has a collar 58, a partly threaded bearing surface 59 and a tapered spindle 60 incorporated therein. A ball bearing race 61 is pressed onto the bearing surface 59 and clamped thereon against the collar 58 by a collar 62 which engages the threaded portion of the said bearing surface 59. A beveled gear 63 is mounted upon the tapered spindle 60 and is rigidly secured thereon by means of a lock washer 64 and a nut 65 which engage the end of the tapered spindle 60. The axle 57 with its tapered spindle 60 and beveled gear 63 mounted thereon is passed through the aperture 43 of the gear covering 38 and engages the beveled pinion 44. A secondary yoke 66, having ears 67 and 68 and flanges 69 corresponding to the shape of the gear covering 38, and a bearing 70 incorporated therein, is mounted upon the axle 57. A bearing aperture 71 and axle aperture 72 are provided in the secondary yoke 66 and the bearing 70 respectively to permit mounting the said secondary yoke 66 upon the said axle 57. A ball bearing race 61 engages the bearing aperture 71 of the secondary yoke 66. Apertures 73 and 74 are provided in the ears 67 and 68 respectively, and are adapted to engage the secondary stud 52 and the primary stud 46 in order to form a knuckle joint. The flanges 69 of the secondary yoke 66 engage the gear covering 38 around the apertures 43 in order to form a dust-proof covering without interfering with the steering arrangement of the wheel 8. An axle sleeve 75 which is mounted upon the axle 57 engages the outer periphery of the bearing 70 of the secondary yoke 66. The bearing 76 is mounted upon the axle sleeve 75 and the bearing 77 is mounted upon the secondary yoke 66 in line with the bearing 76. A shaft 78, having a lever arm 79, and an arm 80 carrying a ball 81, incorporated therein, is mounted in the bearings 76 and 77. Collars 82 are mounted upon the shaft 78 in order to prevent side play. An arm 83 is mounted upon the lug 19 and has an aperture 84 incorporated therein. The said arm 83 has a socket 94 provided therein to provide a connection for the steering knuckle tie rod 95. A brake band 85 is secured to the arm 14 and engages the brake drum 3. A rod 86 having a spring 87 mounted thereon engages the aperture 84 and is pivoted to the brake band 85 as shown at 88, and to the arm 89 which carries a ball 90, and is pivoted to the brake band 85 as shown at 91. A rod 92 having bearing sockets 93 incorporated in their ends engages the ball 81 of the arm 80 and the ball 90 of the arm 89.

In operation, power is transmitted to the axle 57 carrying the beveled gear 63, thence through the beveled pinion 44 to the beveled gear 27, and the fluted spindle 30, and into the wheel 8 through the hub 1 and bearing 2. The ball and socket joints of the rod 92 and the arms 80 and 89 permit easy application of the brake band 85, while steering the wheel 8 through the knuckle joint formed by the primary yoke 12, the secondary yoke 66, and the primary stud 46 and the secondary stud 52.

While I have herein described a certain specific method of constructing and assembling the elements of my invention, it is understood same may be varied in minor details, not departing from the spirit of my invention as defined in the appended claims.

I claim:

1. In a four wheel motor drive as described the combination of a wheel hub formed with a spindle bearing and a brake drum, the said spindle bearing being provided with a fluted spindle aperture; a primary yoke formed with pivot apertures journaled in said wheel hub; a gear housing provided with an axle aperture secured to said primary yoke; a secondary yoke provided with pivot apertures and flanges mounted over said gear housing, the said flanges partially covering the axle aperture and forming a dust-proof housing; the pivot apertures of said secondary yoke are aligned with pivot apertures of said primary yoke and have pivots mounted therein; an axle passed thru the secondary yoke, journaled in said secondary yoke and extended into said gear housing; a gear secured to said axle; a pinion rotatively mounted on one of the pivots meshing with said gear on said axle; a gear provided with a fluted spindle journaled in said primary yoke, said gear meshing with said pinion and having its fluted spindle secured in said fluted aperture of said hub; and braking means mounted upon said brake drum and said secondary yoke.

2. In a device of the kind described a front wheel driving mechanism, comprising a hub provided with a tapering fluted spindle aperture; a primary yoke journaled upon a ball bearing thrust bearing in said hub; pivot arms incorporated in said primary yoke provided with pivot stud apertures and grooves in the edges of said pivot arms; a gear housing provided with tongues which are adapted to engage the grooves of the pivot arms of said primary yoke secured to said primary yoke; said gear housing is provided with an axle aperture; a secondary yoke formed with flanges which are adapted to engage the said gear housing over said axle aperture to make said gear housing dust-proof; pivot arms provided with pivot stud apertures incorporated in secondary yoke aligned with said pivot stud apertures of said primary yoke; pivot studs mounted on ball bearing thrust bearings engaging said pivot stud apertures of said secondary and primary yokes; a gear formed with a tapering fluted spindle mounted in said fluted hub aperture; a pinion mounted upon the lower pivot stud engaging said gear; and axle journaled in said secondary yoke carrying the gear meshing with said pinion; and means for steering said front wheel.

In testimony whereof I affix my signature.

CHARLES S. ALLEN.